(12) United States Patent
Yin et al.

(10) Patent No.: US 9,710,725 B2
(45) Date of Patent: Jul. 18, 2017

(54) METHOD AND SYSTEM FOR EXTRACTING IMAGE SALIENT CURVE

(71) Applicant: SHENZHEN INSTITUTES OF ADVANCED TECHNOLOGY CHINESE ACADEMY OF SCIENCES, Shenzhen (CN)

(72) Inventors: Kangxue Yin, Shenzhen (CN); Hui Huang, Shenzhen (CN)

(73) Assignee: Shenzhen Institutes Of Advanced Technology Chinese Academy Of Sciences, Shenzhen, Guangdong (CN)

( * ) Notice: Subject to any disclaimer, the term of this patent is extended or adjusted under 35 U.S.C. 154(b) by 20 days.

(21) Appl. No.: 14/902,332

(22) PCT Filed: Dec. 4, 2013

(86) PCT No.: PCT/CN2013/088530
§ 371 (c)(1),
(2) Date: Dec. 30, 2015

(87) PCT Pub. No.: WO2015/043063
PCT Pub. Date: Apr. 2, 2015

(65) Prior Publication Data
US 2016/0189005 A1 Jun. 30, 2016

(30) Foreign Application Priority Data
Sep. 26, 2013 (CN) .......................... 2013 1 0444485

(51) Int. Cl.
*G06K 9/62* (2006.01)
*G06K 9/48* (2006.01)
(Continued)

(52) U.S. Cl.
CPC .......... *G06K 9/6251* (2013.01); *G06K 9/342* (2013.01); *G06K 9/4671* (2013.01); *G06K 9/48* (2013.01);
(Continued)

(58) Field of Classification Search
CPC .... G06K 9/6251; G06K 9/342; G06K 9/4671; G06K 9/48; G06K 9/481; G06K 9/6207; G06T 7/13
See application file for complete search history.

(56) References Cited

U.S. PATENT DOCUMENTS 8,488,845 B1   7/2013 Tang et al.
8,520,004 B2 * 8/2013 Pedersen ................ G06T 11/20
                                                                345/442
(Continued)

FOREIGN PATENT DOCUMENTS

CN        103065333 A     4/2013

OTHER PUBLICATIONS

Fisher et al, "Design of Tangent Vector Fields", 2007, ACM transactions on graphics (TOG). vol. 26. No. 3., pp. 1-9.*
(Continued)

*Primary Examiner* — David F Dunphy
(74) *Attorney, Agent, or Firm* — Ladas & Parry, LLP

(57) ABSTRACT

Provided is a method for extracting an image salient curve. The method comprises the following steps: drawing an approximate curve along a salient edge of an image from which a salient curve is to be extracted; obtaining short edges in the image; calculating a harmonic vector field by using the drawn curve as a boundary condition; filtering the short edges in the image by using the harmonic vector field; updating the vector field by using the short edges left in the image as boundary conditions; and obtaining an optimal salient curve of the image by using the energy of a mini-
(Continued)

mized spline curve in the vector field. Also provided is a system for extracting an image salient curve. The image salient curve can ensure the smoothness and a bending characteristic.

10 Claims, 2 Drawing Sheets

(51) Int. Cl.
    *G06K 9/34*        (2006.01)
    *G06K 9/46*        (2006.01)
    *G06T 7/13*         (2017.01)
    *G06K 9/36*        (2006.01)

(52) U.S. Cl.
    CPC ........... *G06K 9/481* (2013.01); *G06K 9/6207* (2013.01); *G06T 7/13* (2017.01); *G06K 2009/366* (2013.01); *G06K 2009/484* (2013.01)

(56) References Cited

U.S. PATENT DOCUMENTS

| | | | |
|---|---|---|---|
| 8,521,484 B2* | 8/2013 | Stander | G06F 17/175 703/2 |
| 2009/0027396 A1* | 1/2009 | Frisken | G06T 11/203 345/442 |
| 2011/0026793 A1* | 2/2011 | Goel | G06T 7/0085 382/131 |
| 2012/0320063 A1* | 12/2012 | Finch | G06T 11/203 345/442 |
| 2014/0334737 A1* | 11/2014 | Shao | G06K 9/481 382/197 |
| 2015/0201175 A1* | 7/2015 | Sartor | G06T 5/005 382/107 |

OTHER PUBLICATIONS

Perrone, "Contact metric manifolds whose characteristic vector field is a harmonic vector field," 2004, Differential Geometry and its Applications 20 (2004), pp. 367-378.*

ISR for PCT/CN2013/088530 mailed on Jun. 19, 2014 and its English translation by WIPO.

Gao, Xiangjun et al. Improved VFC Snake model. Application Research of Computers. vol. 27, No. 4, Apr. 15, 2013, ISSN 1001-3695, the whole document and its English translation by Google Translate/OCR by Abode Acrobat Pro.

* cited by examiner

METHOD AND SYSTEM FOR EXTRACTING IMAGE SALIENT CURVE

CROSS-REFERENCE TO RELATED APPLICATIONS

This application is a U.S. Stage of International Patent Application No. PCT/CN2013/088530 filed on Dec. 4, 2013, which claims the benefit of and priority to Chinese Patent Application 20130444485.9 filed on Sep. 26, 2013, the disclosures of which are hereby incorporated in their entireties by reference.

TECHNICAL FIELD

The present disclosure relates to a method and system for extracting image salient curve.

BACKGROUND

Image salient curve extraction is an important research direction in image processing field. Existing interactive methods for extracting image salient curve mainly include dynamic snakes method, intelligent scissors method, etc.

The dynamic snakes method is an important edge-based interactive method for extracting image salient curve. After the Snake model was first propounded by Kass, et al in 1987, the energy functions of and solving methods for this model have been being continuously improved and many new Snake models and improvements have been propounded. The basic idea of the dynamic snakes method is very simple. It matches template, which is spline curve generated by a plurality of control points, with local features of the image through elastic deformation of the template itself to achieve harmony, i.e., to achieve some kinds of minimization of energy function, to achieve the extraction of the image salient curve. However, the dynamic snakes method has some drawbacks: the location of initial curve is strictly limited, which must be very close to the real outline of the target, otherwise a bad convergence result will be obtained; good convergence effect cannot be obtained for concave outline of target; and speed of iteration is slow and convergence effect is not good.

The intelligent scissors method is a very classic semi-automatic method for extracting image salient curve. When a user moves the mouse approximately along an edge in an image, the intelligent scissors method can estimate a relatively accurate edge curve. The intelligent scissors method assigns weights to pixels by using Laplacian zero-crossing function, gradient magnitude and gradient directions, and solve a target contour between two points by way of solving an optimal path by dynamic programming. With the movement of the mouse, the intelligent scissors method can relatively accurately and quickly extract the contour of the target. When the mouse is moved to the vicinity of the contour of the target, the intelligent scissor can be automatically snapped onto the contour of the target. The intelligent scissors method also has some drawbacks: wrong input of the user cannot be identified, and the obtained curves are not smooth enough.

SUMMARY

In view of this, it is necessary to provide a method and system for extracting image salient curve.

The present disclosure provides a method for extracting image salient curve which includes following steps: a. drawing a curve on an image, from which the salient curve is to be extracted, along a salient edge thereof; b. obtaining short edges in the image; c. calculating a harmonic vector field by using the drawn curve as a boundary condition; d. filtering the short edges in the image by using the harmonic vector field; e. updating the vector field by using the short edges left in the image as boundary conditions; and f. obtaining an optimal salient curve of the image by minimizing energy of a spline curve in the vector field.

Wherein in the step b, the short edges in the image are obtained by canny operator, Prewitt operator, Sobel operator or Kirsch operator.

Wherein the step c comprises deeming the curve drawn in the step a as a boundary of a two-dimensional manifold and solving $\Delta u=0$ (u is the vector field) by using tangential vectors at the boundary as boundary values to obtain the harmonic vector field.

Wherein the step d comprises defining a score for each of the short edges: Score=$\alpha 1$*a length of its own—$\alpha 2$*an average angle with respect to the harmonic vector field—$\alpha 3$*a mean curvature—$\alpha 4$*an average distance from the curve drawn by a user, wherein $\alpha 1$, $\alpha 2$, $\alpha 3$ and $\alpha 4$ are weights of items, respectively.

Wherein the salient curve is an objective function as following:

$$f(C)=E_{distance}(C)+E_{vector}(C)+E_{smooth}(C)$$

wherein C is a cubic B-spline curve, $E_{distance}(C)$ defines a sum of distances of all pixels on the short edge from C, $E_{vector}(C)$ is an integration of angles between tangents of C and the vector field along C, and $E_{smooth}(C)$ is a smoothness of C which is measured by curvature.

The present disclosure provides a system for extracting image salient curve which includes an input unit, a short edge obtaining unit, a calculation unit, a filter unit, an update unit and a salient curve obtaining unit which are electrically connected sequentially, where the input unit is used for receiving a curve drawn in an image, from which the salient curve is to be extracted, along a salient edge thereof; the short edge obtaining unit is used for obtaining short edges in the image; the calculation unit is used for calculating a harmonic vector field by using the curve drawn by a user as a boundary condition; the filter unit is used for filtering the short edges in the image by using the harmonic vector field; the update unit is used for updating the vector field by using the short edges left in the image as boundary conditions; the salient curve obtaining unit is used for obtaining an optimal salient curve of the image by minimizing energy of a spline curve in the vector field.

Wherein the short edges in the image are obtained by canny operator, Prewitt operator, Sobel operator or Kirsch operator.

Wherein the calculation unit is used for deeming the curve received by the input unit as a boundary of a two-dimensional manifold and solving $\Delta u=0$ (u is the vector field) by using tangential vectors at the boundary as boundary values to obtain the harmonic vector field.

Wherein the filter unit is used for defining a score for each of the short edges: Score=$\alpha 1$*a length of its own—$\alpha 2$*an average angle with respect to the harmonic vector field—$\alpha 3$*a mean curvature—$\alpha 4$*an average distance from the curve drawn by a user, wherein $\alpha 1$, $\alpha 2$, $\alpha 3$ and $\alpha 4$ are weights of items, respectively.

Wherein the salient curve is an objective function as following:

$$f(C)=E_{distance}(C)+E_{vector}(C)+E_{smooth}(C)$$

wherein C is a cubit B-spline curve, $E_{distance}(C)$ defines a sum of distances of all pixels on the short edge from C, $E_{vector}(C)$ is an integration of angles between tangents of C and the vector field along C, and $E_{smooth}(C)$ is a smoothness of C which is measured by curvature.

By introducing the harmonic vector field, the methods and systems for extracting image salient curve provided by the present disclosure naturally combine the interaction of the user and the information of the image itself together and consider a variety of information. Therefore they are insensitive to input errors of the user and can obtain good results for target curves with concave portions. When solving the salient curve, the consistence with the vector field, the distance from the short edges and the smoothness are simultaneously considered, therefore the result is more stable and easy to quickly converge to an optimal solution, and both the smoothness and the bending characteristics of the obtained salient curve of the image can be ensured.

DETAILED DESCRIPTION

The present disclosure will be further described with reference to the drawings and the specific embodiments.

Figure 1:
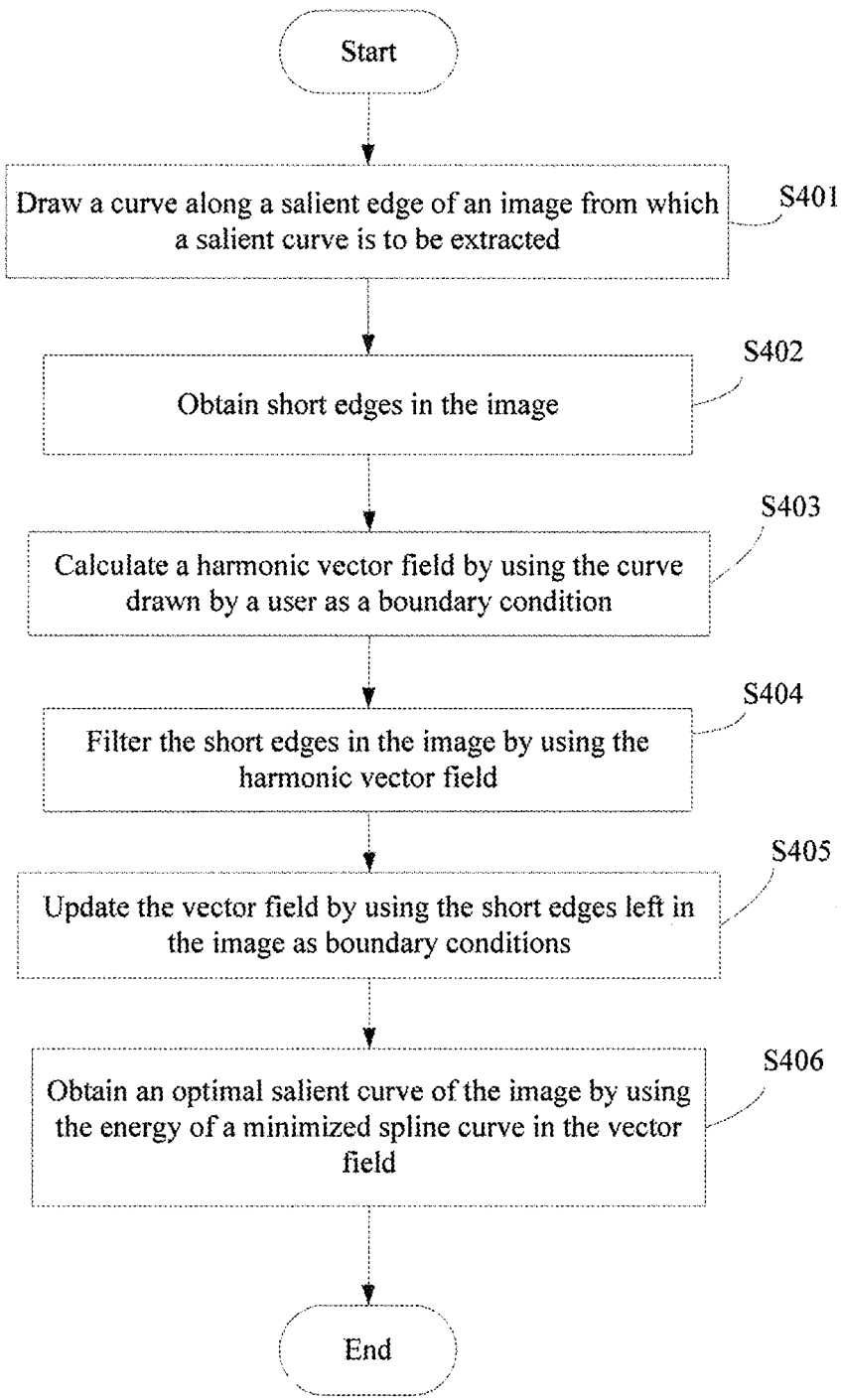
FIG. 1 is a flow chart of a method for extracting image salient curve according to the present disclosure.

FIG. 1 shows a flow chart of a preferred embodiment of a method for extracting image salient curve according to the present disclosure.

Step S401: drawing a curve on an image, from which a salient curve is to be extracted, along a salient edge thereof. Specifically, a user may manually draw a curve on the image approximately along the salient edge thereof using software which is developed based on, for example, opencv, MFC or QT library, etc.

Step S402: obtaining short edges in the image. In the present embodiment, the short edges in the image may be obtained by Canny operator. Other edge detection operators may also be used to replace the Canny operator, such as Prewitt operator, Sobel operator, Kirsch operator, or the like.

The specific steps may be as following:

1) filtering the image using a Gaussian filter to eliminate noise;

2) for each pixel in the image, calculating differential approximations in both transverse direction and longitudinal direction thereof to obtain magnitude and direction of the gradient of the pixel;

3) performing "non-maxima suppression" on the gradients of the pixels obtained above: when the gradient of a pixel is not a local maxima, it is set to zero; when the gradient of the pixel is a local maxima, it keeps unchanged. "Local" herein refers to a small neighborhood centered on the pixel, the radius of which may be set according to the requirements of the user.

4) filtering the pixels by means of their gradients to obtain potential edge pixels. I.e. the gradients of the pixels may be filtered by a high threshold and a low threshold and the remaining pixels may be the potential edge pixels. The gradients of the edge pixels must be between the high threshold and the low threshold.

5) connecting the edge pixels to obtain the short edges in the image.

Step S403: calculating a harmonic vector field by using the curve drawn by the user as a boundary condition. The harmonic vector field may be an irrotational vector field, i.e. the curl throughout the vector field is zero. Specifically, deeming the curve drawn by the user in the step S401 as a boundary of a two-dimensional manifold, the harmonic vector field may be obtained by solving $\Delta u=0$ (u is the vector field) by using tangential vectors at the boundary as boundary values.

When solved, the x component and the y component of u may be separately solved. This way, the problem may be converted into two partial differential equations under Dirichlet constraints.

$$\mathrm{argmin}_u \Delta u, \text{ s.t. } u_0 = b$$

Where $\Delta u$ is a Laplace operator of the vector field u, $u_0$ is a boundary value of the solved vector field, and b is a boundary value determined by the curve defined by the user.

Step S404: filtering the short edges in the image by using the harmonic vector field. Specifically, a score may be defined for each of the short edges: Score=$\alpha 1$*the length of its own—$\alpha 2$*the average angle with respect to the harmonic vector field—$\alpha 3$*the mean curvature—$\alpha 4$*the average distance from the curve drawn by the user, where $\alpha 1$, $\alpha 2$, $\alpha 3$ and $\alpha 4$ are weights of the items, respectively. By combination of $\alpha 1$, $\alpha 2$, $\alpha 3$ and $\alpha 4$, the short edges may be retained according to following rules: the retained short edges should be as long as possible; the tangential directions of the retained short edges should be as consistent with the harmonic vector field as possible; the curvatures of the retained short edges should be small; and the retained short edges should close to the curve drawn by the user.

Step S405: updating the vector field by using the short edges left in the image as boundary conditions. Specifically, deeming the short edges left in the image as boundaries of a two-dimensional manifold, the harmonic vector field may be updated by solving $\Delta u=0$ (u is the vector field) by using the tangential vectors at the boundaries as the boundary values.

Step S406: obtaining an optimal salient curve of the image by minimizing the energy of a spline curve in the vector field. The specific steps are as following:

In the present embodiment, a cubic B-spline curve may be used to represent the salient curve. Other free curves may also be used to replace the cubic B-spline curve, such as Bezier curve, non-uniform rational B-spline, or the like.

In the present embodiment, the curve drawn by the user may be used as initial values, and the salient curve may be defined as an objective function as following:

$$f(C) = E_{distance}(C) + E_{vector}(C) + E_{smooth}(C)$$

Where C is the cubic B-spline curve, $E_{distance}(C)$ defines a sum of the distances of all pixels on the short edge from C, $E_{vector}(C)$ is an integration of the angles between the tangents of C and the vector field along C, and $E_{smooth}(C)$ is the smoothness of C which may be measured by curvature.

Minimizing f(C) is an unconstrained optimization problem. In the present embodiment, a BFGS operator may be used to solve the salient curve. Other optimization operators may also be used to replace the BFGS operator, such as steepest descent method, Newton method, or the like.

Figure 2:
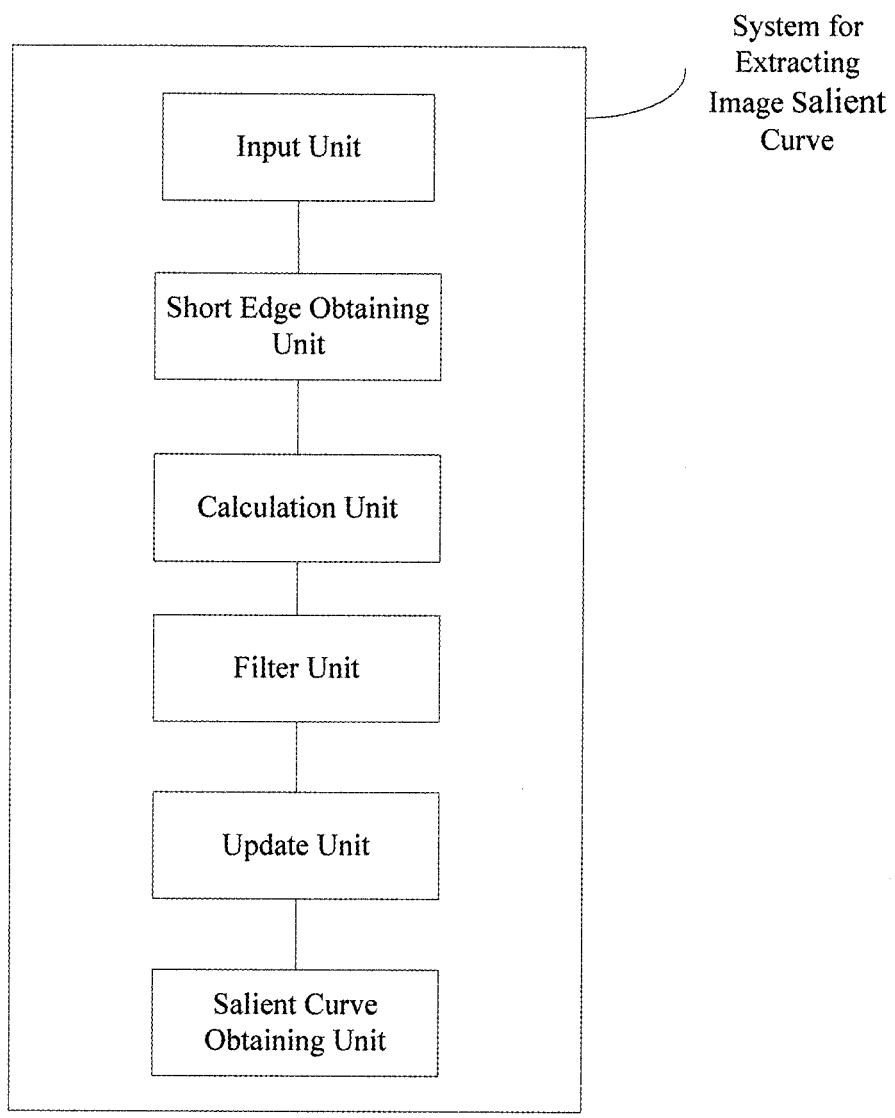
FIG. 2 is a hardware architecture diagram of a system for extracting image salient curve according to the present disclosure.

FIG. 2 shows a hardware architecture diagram of a system for extracting image salient curve according to the present disclosure. The system may include an input unit, a short edge obtaining unit, a calculation unit, a filter unit, an update unit and a salient curve obtaining unit which are electrically connected sequentially.

The input unit may be used for receiving a curve drawn in the image, from which the salient curve is to be extracted, along the salient edge thereof. Specifically, the user may manually draw a curve on the image approximately along the salient edge thereof using software which is developed based on, for example, opencv, MFC or QT library, etc, and the input unit may receive the curve drawn by the user.

The short edge obtaining unit may be used for obtaining short edges in the image. In the present embodiment, the short edge obtaining unit may obtain the short edges in the image by Canny operator. Other edge detection operators may also be used to replace the Canny operator, such as Prewitt operator, Sobel operator, Kirsch operator, or the like.

Specifically:

1) filtering the image using a Gaussian filter to eliminate noise;

2) for each pixel in the image, calculating differential approximations in both transverse direction and longitudinal direction thereof to obtain magnitude and direction of the gradient of the pixel;

3) performing "non-maxima suppression" on the gradients of the pixels obtained above: when the gradient of a pixel is not a local maxima, it is set to zero; when the gradient of the pixel is a local maxima, it keeps unchanged. "Local" herein refers to a small neighborhood centered on the pixel, the radius of which may be set according to the requirements of the user.

4) filtering the pixels by means of their gradients to obtain potential edge pixels. I.e. the gradients of the pixels may be filtered by a high threshold and a low threshold and the remaining pixels may be the potential edge pixels. The gradients of the edge pixels must be between the high threshold and the low threshold.

5) connecting the edge pixels to obtain the short edges in the image.

The calculation unit may be used for calculating a harmonic vector field by using the curve drawn by the user as a boundary condition. The harmonic vector field may be an irrotational vector field, i.e. the curl throughout the vector field is zero. Specifically, deeming the curve drawn through the input unit by the user as a boundary of a two-dimensional manifold, the harmonic vector field may be obtained by solving $\Delta u=0$ (u is the vector field) by using tangential vectors at the boundary as boundary values.

When solved, the x component and the y component of u may be separately solved. This way, the problem may be converted into two partial differential equations under Dirichlet constraints.

$$\arg\min_u \Delta u, \text{ s.t. } u_0=b$$

Where $\Delta u$ is a Laplace operator of the vector field u, $u_0$ is a boundary value of the solved vector field, and b is a boundary value determined by the curve defined by the user.

The filter unit may be used for filtering the short edges in the image by using the harmonic vector field. Specifically, the filter unit may define a score for each of the short edges: Score=$\alpha 1$*the length of its own—$\alpha 2$*the average angle with respect to the harmonic vector field—$\alpha 3$*the mean curvature—$\alpha 4$*the average distance from the curve drawn by the user, where $\alpha 1$, $\alpha 2$, $\alpha 3$ and $\alpha 4$ are weights of the items, respectively. By combination of $\alpha 1$, $\alpha 2$, $\alpha 3$ and $\alpha 4$, the short edges may be retained according to following rules: the retained short edges should be as long as possible; the tangential directions of the retained short edges should be as consistent with the harmonic vector field as possible; the curvatures of the retained short edges should be small; and the retained short edges should close to the curve drawn by the user.

The update unit may be used for updating the vector field by using the short edges left in the image as boundary conditions. Specifically, deeming the short edges left in the image as boundaries of a two-dimensional manifold, the update unit may update the harmonic vector field by solving $\Delta u=0$ (u is the vector field) by using the tangential vectors at the boundaries as the boundary values.

The salient curve obtaining unit may be used for obtaining an optimal salient curve of the image by minimizing the energy of a spline curve in the vector field. Specifically:

In the present embodiment, a cubic B-spline curve may be used to represent the salient curve. Other free curves may also be used to replace the cubic B-spline curve, such as Bezier curve, non-uniform rational B-spline, or the like.

In the present embodiment, the curve drawn by the user may be used as initial values, and the salient curve may be defined as an objective function as following:

$$f(C)=E_{distance}(C)+E_{vector}(C)+E_{smooth}(C)$$

Where C is the cubic B-spline curve, $E_{distance}(C)$ defines a sum of the distances of all pixels on the short edge from C, $E_{vector}(C)$ is an integration of the angles between the tangents of C and the vector field along C, and $E_{smooth}(C)$ is the smoothness of C which may be measured by curvature.

Minimizing f(C) is an unconstrained optimization problem. In the present embodiment, a BFGS operator may be used to solve the salient curve. Other optimization operators may also be used to replace the BFGS operator, such as steepest descent method, Newton method, or the like.

The present disclosure has been described with reference to the present preferred embodiments. However, a person skilled in the art should understand that the preferred embodiments above are only used to illustrate the present disclosure, but not to limit the scope of protection thereof. Any modification, equivalent, and improvement made within the spirit and principles of the present disclosure should be within the scope of the claims of the present disclosure.

We claim:

1. A method for extracting image salient curve, comprising steps of:
   a. drawing a curve on an image from which a salient curve is to be extracted along a salient edge thereof;
   b. obtaining short edges in the image;
   c. calculating a harmonic vector field by using the drawn curve as a boundary condition;
   d. filtering the short edges in the image by using the harmonic vector field;
   e. updating the vector field by using the short edges left in the image as boundary conditions; and
   f. obtaining an optimal salient curve of the image by minimizing energy of a spline curve in the vector field.

2. The method of claim 1, wherein in the step b, the short edges in the image are obtained by canny operator, Prewitt operator, Sobel operator or Kirsch operator.

3. The method of claim 1, wherein the step c comprises deeming the curve drawn in the step a as a boundary of a two-dimensional manifold and solving $\Delta u=0$ (u is the vector field) by using tangential vectors at the boundary as boundary values to obtain the harmonic vector field.

4. The method of claim 1, wherein the step d comprises defining a score for each of the short edges: Score=$\alpha 1$*a length of its own—$\alpha 2$*an average angle with respect to the harmonic vector field—$\alpha 3$*a mean curvature—$\alpha 4$*an average distance from the curve drawn by a user, wherein α1, α2, α3 and α4 are weights of items, respectively.

5. The method of claim 1, wherein the salient curve is an objective function as following:

$$f(C)=E_{distance}(C)+E_{vector}(C)+E_{smooth}(C)$$

wherein C is a cubic B-spline curve, $E_{distance}(C)$ defines a sum of distances of all pixels on the short edge from C, $E_{vector}(C)$ is an integration of angles between tangents of C and the vector field along C, and $E_{smooth}(C)$ is a smoothness of C which is measured by curvature.

6. A system for extracting image salient curve comprising an input unit, a short edge obtaining unit, a calculation unit, a filter unit, an update unit and a salient curve obtaining unit which are electrically connected sequentially, wherein:
the input unit is used for receiving a curve drawn in an image from which the salient curve is to be extracted along a salient edge thereof;
the short edge obtaining unit is used for obtaining short edges in the image;
the calculation unit is used for calculating a harmonic vector field by using the curve drawn by a user as a boundary condition;
the filter unit is used for filtering the short edges in the image by using the harmonic vector field;
the update unit is used for updating the vector field by using the short edges left in the image as boundary conditions;
the salient curve obtaining unit is used for obtaining an optimal salient curve of the image by minimizing energy of a spline curve in the vector field.

7. The system of claim 6, wherein the short edges in the image are obtained by canny operator, Prewitt operator, Sobel operator or Kirsch operator.

8. The system of claim 6, wherein the calculation unit is used for deeming the curve received by the input unit as a boundary of a two-dimensional manifold and solving Δu=0 (u is the vector field) by using tangential vectors at the boundary as boundary values to obtain the harmonic vector field.

9. The system of claim 6, wherein the filter unit is used for defining a score for each of the short edges: Score=α1*a length of its own—α2*an average angle with respect to the harmonic vector field—α3*a mean curvature—α4*an average distance from the curve drawn by a user, wherein α1, α2, α3 and α4 are weights of items, respectively.

10. The system of claim 6, wherein the salient curve is an objective function as following:

$$f(C)=E_{distance}(C)+E_{vector}(C)+E_{smooth}(C)$$

wherein C is a cubic B-spline curve, $E_{distance}(C)$ defines a sum of distances of all pixels on the short edge from C, $E_{vector}(C)$ is an integration of angles between tangents of C and the vector field along C, and $E_{smooth}(C)$ is a smoothness of C which is measured by curvature.

* * * * *